Aug. 18, 1964  O. HAUGWITZ  3,144,949
CABLE HAULING APPARATUS
Filed Jan. 16, 1963  9 Sheets—Sheet 2

Aug. 18, 1964        O. HAUGWITZ        3,144,949
CABLE HAULING APPARATUS

Filed Jan. 16, 1963                    9 Sheets-Sheet 9

Fig. 10

United States Patent Office

3,144,949
Patented Aug. 18, 1964

3,144,949
CABLE HAULING APPARATUS
Otto Haugwitz, La Celle-Saint-Cloud, France, assignor to Société Anonyme Geoffroy-Delore, Paris, France
Filed Jan. 16, 1963, Ser. No. 251,833
Claims priority, application France Jan. 19, 1962
11 Claims. (Cl. 214—338)

This invention relates to apparatus for pulling cables and similar rope-like articles during the manufacture thereof or other handling operations to which such articles may be subjected. It relates more particularly though not exclusively to such apparatus for simultaneously hauling the cable along the direction of its axis while rotating it about said axis, at a predetermined angular speed.

In the manufacture of cables and the like it is frequently required to advance the cable longitudinally along the direction of its axis while simultaneously rotating it about its axis in order to feed the cable to a revolving take-up device. This requirement raises many practical problems especially when the cables are many inches in diameter. The apparatus used for the purpose generally comprises a revolving frame on which is supported one or more endless track means having a straight stretch extending parallel and adjacent to the axis of frame rotation to one, or each, side thereof. The endless track means supports a series of cable gripping members around its length. The revolving frame is rotated about its axis, the endless track means is driven in rotation around the frame as the frame revolves, and the cable to be hauled and rotated is fed into the revolving frame along the axis of frame rotation and hence alongside the straight stretch of the endless track means so as to be gripped by the gripping members throughout the straight stretch, thereby simultaneously feeding and rotating the cable.

The gripping members in such conventional apparatus comprise pairs of shoes made or lined with a material having a high coefficient of friction relative to the cable surface, and resiliently pressed toward each other so as to grip the cable between them in the straight stretch of their path. It is of great importance, in apparatus of this kind, that the gripping force applied to the cable by the gripping members should consistently retain a prescribed value with a high degree of uniformity throughout the hauling operation. Otherwise objectionable variations in cable feed rate and tension may cause snarling and other serious consequences in a continuous manufacturing or processing plant. However, heretofore the maintenance of uniform gripping pressure has been found extremely difficult to achieve. One important reason among others is the action of centrifugal force in the revolving frame, which tends to pull the friction shoes of the gripper members away from each other and from the cable, thereby varying the resulting gripping pressure as a function of the angular speed of frame rotation. Since the requisite gripping force must usually be proportional to the weight of the cable per unit length and hence proportional to the square of the cable radius, regardless of draft speed and angular velocity, the aforementioned variation of gripping pressure with angular velocity raises a serious difficulty, especially where the apparatus is to be used with cables having a wide range of diameters, and has required the provision of complicated means for regulating the gripping pressure during operation of the apparatus. Such regulating means have complicated the construction and maintenance of the resulting apparatus, and are frequently unreliable and have been a source of various troubles.

Another difficulty that is encountered in conventional apparatus of the kind described is that considerable twisting forces tend to be developed about the axis of rotation of the revolving frame, tending to distort the gripping members and impair their effectiveness.

Generally the objects of the invention are to overcome these difficulties in a complete and positive manner, and to provide apparatus for pulling rope-like articles in which the pressure exerted by the gripping means can be preset to a desired value and will thereafter retain such value accurately and reliably regardless of possible variations in operating conditions, thereby eliminating or greatly reducing the requirement for adjustment during operation. An object is to eliminate objectionable torsional stresses. Broader objects include the provision of apparatus for pulling rope-like articles, and apparatus for simultaneously pulling and rotating rope-like articles, which will be more efficient and reliable than those heretofore available, which will permit improved control over the gripping pressure applied to the article as a function of diameter and other factors, and which will be usable for handling rope-like articles in a wide range of diameters. Other objects will appear as the disclosure proceeds.

In accordance with an important aspect of the invention, apparatus is provided for hauling a rope-like article comprising a frame, endless track means mounted on the frame for continuous displacement therearound and including a straight stretch of track. A series of gripping members are supported on the endless track means. Each of the gripping members includes a pair of cooperating gripper elements transversely displaceable with respect to each other and having gripping surfaces directed towards each other. Means resiliently press the gripper elements towards each other into gripping engagement with a rope-like article guided towards and parallel to said straight stretch of track. Latching means on the gripping members operate as both gripper elements of each member reach the start of said straight stretch to lock the elements against transverse displacement away from each other in the article-gripping position as determined by the resilient means through the extent of the straight stretch. The latching means disengage when the gripper elements reach the far end of the straight stretch to release the article.

Other aspects and features of the invention as well as the objects thereof will become apparent from the following detailed description of exemplary embodiments of the invention given by way of illustration but not of limitation, when read with reference to the accompanying drawings wherein:

FIGURE 4 is a cross section on line IV—IV of FIGURE 3;

FIGURE 5 is a partial sectional view of a cable gripping element in a modified form of the embodiment shown in FIGURES 1–4;

FIGURE 6 is a partial, enlarged longitudinal view of part of the apparatus according to a further modification, showing the cable-input ends of the endless track means;

Referring first to the embodiment of the invention illustrated in FIGURES 1–4, the revolving cable-hauling apparatus shown comprises a generally rectangular revolving frame 1 through which a cable 2 is adapted to be pulled by the apparatus in the leftward direction as indicated at F. The frame 1 is mounted for full rotation about an axis coincident with the axis of cable 2 and is arranged to be driven in continuous rotation about said axis. For this purpose frame 1 is provided at its cable-input end with a horizontally projecting tubular stub shaft 3 having an axial bore for the passing of cable 2 through it, stub shaft 3 being supported for rotation in a bearing 4 of the fixed frame structure 5. Splined on stub shaft 3 is a drive pulley 6 connected by a drive belt 7 with a pulley keyed on a main drive shaft 8 shown as projecting from and rotated from any suitable motor means, not shown. At its other, or cable-outlet end, revolving frame 1 is provided with a ball or roller bearing 9 the outer race of which is press fitted in an axial recess of the frame 1, while the inner race of bearing 9 is press fitted around a further tubular shaft 10 aligned with stub shaft 3, so that the cable 2 extends through both tubular shafts 3 and 10. Shaft 10 is journalled by means of twin bearings 11 in a stationary frame member or upright 12. Tubular shaft 10 has a pair of adjacent pulleys 13 and 14 secured to it at its inner end within frame 1, and has a further pulley 15 secured on its outer end and coupled by a drive belt 16 to a pulley keyed on a further drive shaft 17, driven from main shaft 8 through a speed variator device 90. The reasons for the two different rotational mounting and driving assemblies provided at the respective ends of revolving frame 1 will be explained later.

Figure 1:
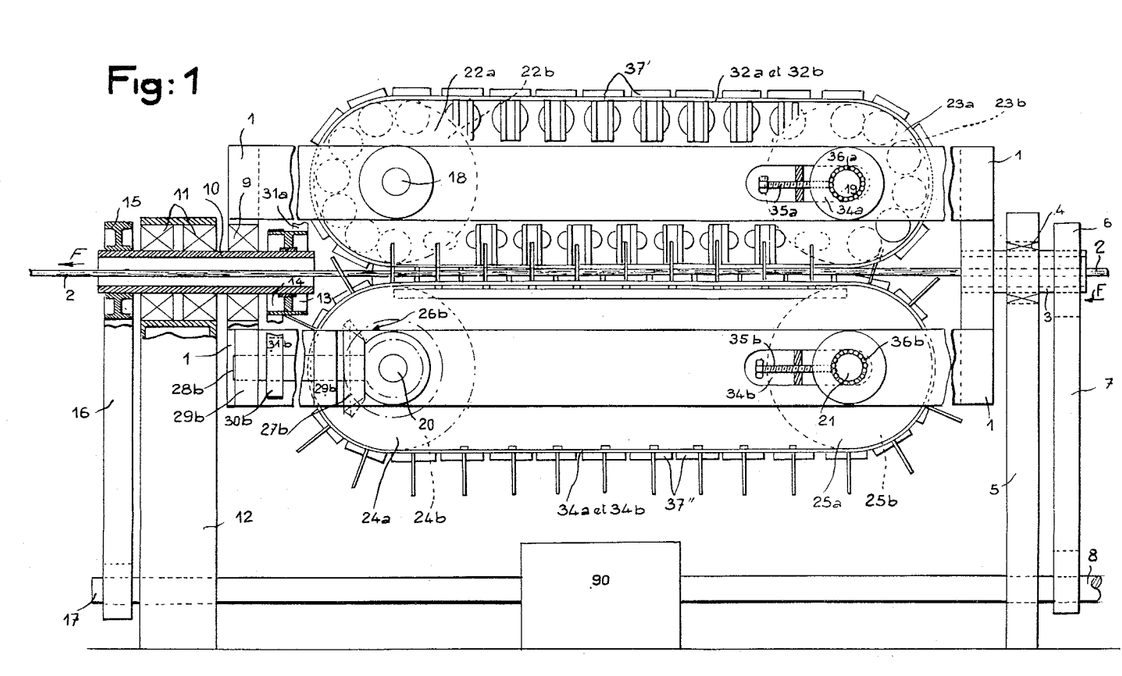
FIGURE 1 is a general longitudinal elevational view of an improved revolving cable-hauling apparatus according to the invention, with some parts broken away and other parts shown in section.
Figure 2:
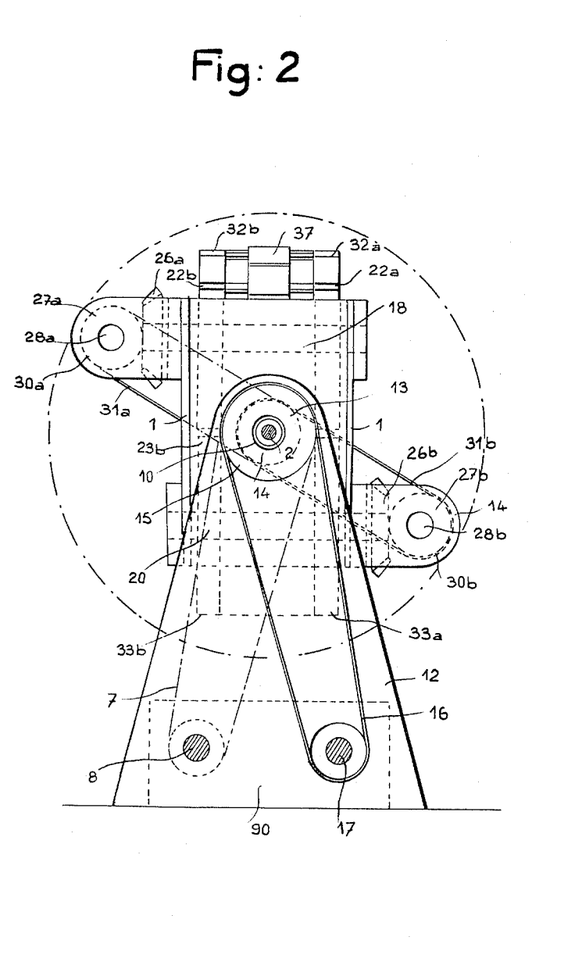
FIGURE 2 is an end view of the apparatus from the cable-output side, i.e. the left side of FIGURE 1.
Figure 3:
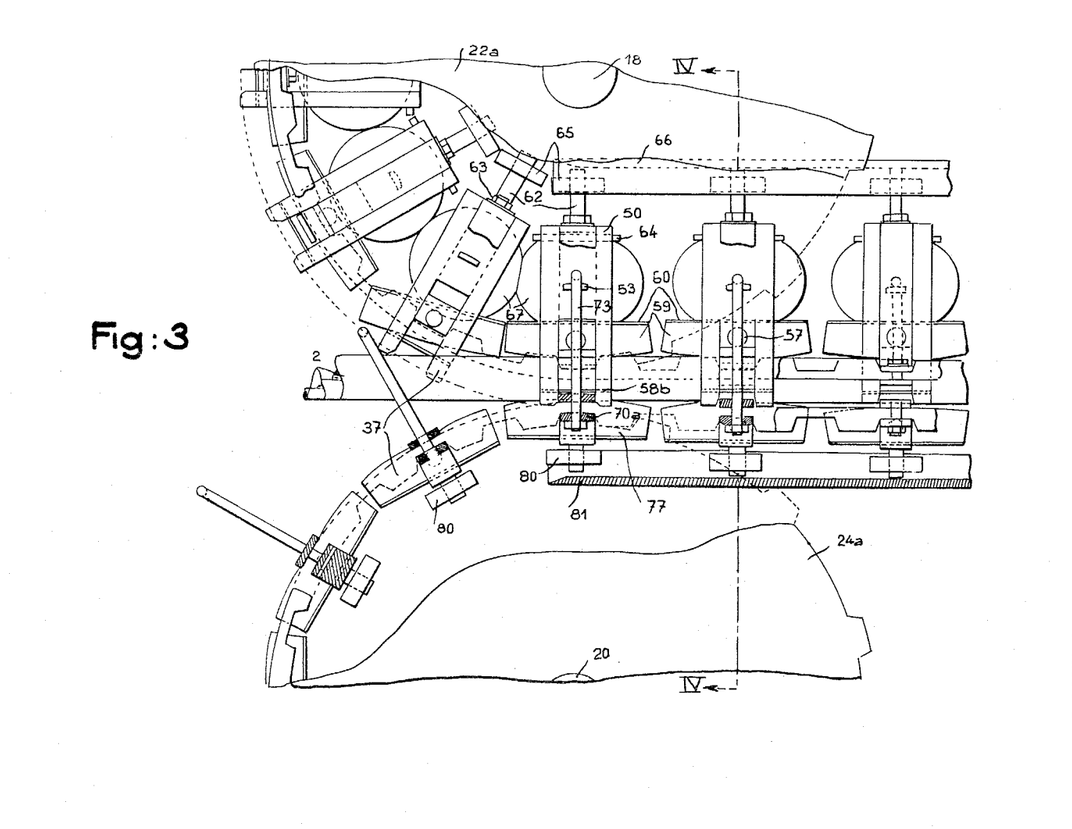
FIGURE 3 is a partial, enlarged view of a portion of FIGURE 1 including the cable-output (lefthand) end of the endless track means.

As best seen in FIGURE 1, the revolving frame 1 has four transverse shafts freely journalled therein with their centers disposed at the vertices of a rectangle, and including the two upper shafts 18 and 19 and lower shafts 20 and 21, said shafts being mounted in the frame 1 by way of suitable ball bearings such as those shown at 36a and 36b. It will be understood that terms such as "upper" and "lower" as used herein to identify the shafts 18–21 and other parts of the revolving frame, have meaning only as referred to the drawings, since such parts actually participate in the revolving motion of the frame 1 in the operation of the apparatus.

Secured in transversely spaced positions on each of the four shafts are a pair of pulleys, respectively pulleys 22a and 22b on shaft 18, 23a and 23b on shaft 19, 24a and 24b on shaft 20 and 25a and 25b on shaft 21. These pulleys serve to mount two pairs of endless Caterpillar tracks. Specifically, a pair of endless Caterpillar tracks 32a and 32b are trained about pulleys 22a and 23a, and 22b and 23b respectively; and a pair of endless belts 34a and 34b are trained around pulleys 24a and 25a and 24b and 25b, respectively.

The shafts 18 and 20 at the cable-output end of the frame are drive shafts, and accordingly have bevel gears 26a and 26b (see FIGURES 1 and 2) secured to them, those gears meshing with further bevel gears 27a and 27b secured on a pair of longitudinal drive shafts 28a and 28b journalled in bearings 29a and 29b in revolving frame 1. Drive shafts 28a and 28b are driven in rotation by way of belt pulleys 30a and 30b fixed thereon and coupled by belts 31a and 31b respectively with the aforementioned pulleys 13 and 14 carried by tubular shaft 10.

It will thus be seen that rotation of the drive shaft 17 by way of variator 90 will (through belt 16) rotate tubular shaft 10 which in turn will cause synchronous rotation in mutually reverse directions of the shafts 18 and 20 and hence pulleys 22a–22b in one direction, and pulleys 24a–24b in the opposite direction, thereby imparting reverse synchronous movements to the two pairs of upper and lower endless tracks 32a–32b and 34a–34b respectively, the directions of movement being such that the adjacent straight stretches of said pairs of endless tracks are all moved leftward (in FIGURE 1) to feed the cable 2 in the direction of arrow F.

To facilitate insertion of the endless tracks around their mounting pulleys and adjustment of their tension, the shafts 19 and 21 are made axially displaceable in elongated apertures 34a and 34b formed in longitudinal side members of revolving frame 1, and said shafts are lockable in their adjusted positions by means of adjusting screws 35a and 35b engageable with the shaft bearings 36a and 36b.

The two endless tracks 32a and 32b of the upper pair participate in supporting an array of identical gripper elements 37′, and the two endless tracks 33a and 33b of the lower pair participate in supporting an array of identical gripper elements 37″. The upper and lower gripper elements 37′ and 37″ are arranged for cooperation such that as the upper and lower endless tracks are synchronously rotated in the manner above indicated, successive pairs of said upper and lower elements are brought into register and participate in providing together a composite cable-gripping member designates 37 (FIGURE 3) which retains its identity throughout the common straight-line stretch of the paths of the cooperating pairs of endless tracks.

The upper cable gripper elements 37′ are each in the form of a rigid U-shaped part 50 (see FIGURE 4) supported across and between both upper tracks 32a and 32b and having straight side flanges 50a and 50b from which extend symmetrically formed legs 51 and 52. Leg 51 has an outward flat extension 51a assembled to track 32a by means of bolts 56a and a clamping plate 55a between which the track is sandwiched. The opposite side leg 52 similarly has a flat extension 52a assembled to track 32b by means of bolts 56b and a clamping plate 55b. The flanges 50a and 50b are each formed with vertical slots open at their lower ends and a crosspin or bolt 57 is supported across both slots for vertical movement therein, which movement is limited in the downward direction (in FIGURE 4) by stop rods 58a and 58b secured across the lower ends of the slot in each side flange 50a, 50b of the U member.

Fixedly supported about the cross-bolt 57 is a generally flat friction segment or shoe 59 (see FIGURES 3 and 4) the under surface of which is engageable with the cable 2 to be pulled, said segment being made from a suitable material having a high coefficient of friction with respect to the cable material; the upper surface of the shoe 59 is outwardly lined with a rigid plate 60.

The upper cross-piece 50c of the U-member is centrally formed with a threaded hole 61 into which is screwed the threaded end of a vertical pin 62, blocked thereon with a locknut 63. The lower end of pin 62 below cross-piece 50 has a flat horizontal disc 64 secured to it. The upper end of pin 62 is press fitted into the inner race of a ball bearing 65 the outer race of which rides in engagement with the inner flange surfaces of a guiding channel 66 secured to revolving frame 1 and extending longitudinally thereon slightly beyond the positions of the centers of pulleys 22a and 23a, whereby its guiding action on the upper gripper elements 37′ will be effectively exerted throughout the full extent of the active stretch of the endless tracks, over which the gripper elements 37′ cooperate with the lower gripper elements 37″ to haul the cable 2, as will presently appear.

Compressed between the lining plate 60 and the plate 64 between the flanges of the U-member is a resilient presser member 67 herein shown as a hollow, normally spherical ball of flexible material filled with gas under pressure, resembling a tennis ball.

The lower gripper elements 37″ each comprise a generally flat strip 70 having a depressed intermediate portion to form a shallow channel adapted to register with the base of the U-shaped member of a corresponding upper gripper element 37'. The end portions 70a and 70b of strip 70 are secured to the respective lower tracks 33a and 33b by means of bolts 72a and 72b and backing flanges 71a and 71b, in a manner similar to the attachment of the upper gripper elements to the upper tracks.

A pair of vertical screw rods 73 and 74 have their lower ends attached with lock nuts in threaded holes formed in the flat extensions of strip 70 to opposite sides of the channel depression therein, and have their upper ends bent inward to provide latching hooks 73a and 74a. As a pair of upper and lower cable gripper elements 37' and 37" reach their cooperating position in the manner earlier described, the latching hooks 73a and 74a of the lower gripper element are arranged to engage over outwardly projecting lugs 53 and 54 respectively, extending from the outer sides 50a and 50b of the U-member of the upper gripper element, thereby latching both elements in their cooperating positions over the whole extent of the active stretch of the endless tracks.

The vertical sides of the channel-like depression in the central part of strip 70 are formed with aligned, vertically elongated slots across which is mounted a crosspin 76 which thus is capable of limited vertical movement, and which is press fitted through a passage formed in a friction segment or shoe 77 made of a material similar to the upper shoe 59 and the upper surface of which is adapted for frictional engagement with the under surface of cable 2.

Formed through the center of the depressed channel portion of strip 70 is a threaded hole 78 in which is screwed the threaded upper end of a pin 79 carrying a bearing roller 80 thereon, riding within a guiding channel 81 supported longitudinally of revolving frame 1 in a position parallel to the upper guide channel 66 and vertically spaced below it.

The provision of the longitudinal guiding means 65–66 and 80–81 serves to overcome torsional forces that tend to be developed in the frame 1 and which otherwise may impair the effectiveness of the cable-gripping members as well as creating other difficulties.

It is noted that in FIGURE 4, the showings on the respective sides of the vertical dot-dash line actually relate to two different gripper members 37; the one to the right of said line has already reached its final active condition in the straight common stretch of the endless tracks, as indicated by the engagement of latch hook 73a with projection 53, while the member to the left of the line has not yet quite reached its active condition, as witnessed by the spacing present between hook 74a and projection 54.

In the operation of the apparatus so far described main drive shaft 8 is rotated from a prime mover not shown, and through belt 7 rotates the revolving frame 1 bodily with all the components supported on it. The speed variator 90 can be set to various drive ratios, it being noted that when the setting is for the ratio 1:1, shaft 17 is rotated at the same speed as shaft 8, so that tubular shaft 10 is rotated in synchronism with the revolving frame, i.e. is stationary with respect thereto. Under these conditions, no longitudinal displacement is imparted to the sets of endless tracks relative to frame 1 through belt drives 31a, 31b and bevel gearings 26a–27a and 26b–27b. When however the variator 90 is set to some other ratio, there is relative rotation between shaft 10 and revolving frame 1, so that the afore-described transmissions impart synchronized displacements to both upper and lower pairs of endless tracks relative to the frame, in one longitudinal direction or the other depending on whether the setting of variator 90 is above or below the neutral setting (unity). In the present instance it is assumed that variator 90 has been set to impart movement to the endless tracks in senses to feed the cable 2 leftward, as earlier indicated, and at a selected feed velocity.

Under these conditions the upper and lower cable gripper elements 37' and 37" are arranged to register with each other in succession at the cable-input end (right hand end) of the common, active, stretch of the endless tracks, whereby their cooperating latching elements 73a–53 and 74a–54 engage one another at the start of said stretch and hold the gripper elements in their latched condition wherein they cooperate in forming the cable gripper members 37 throughout said common active stretch, at the end of which said latching means separate. The engagement and disengagement of the latching means 73a–53 and 74a–54 are effected in an entirely automatic manner and are simply due to the fact that the endless tracks are flat in their common stretch and arcuate beyond the ends of that stretch, coupled with the shape imparted to the cooperating surfaces of the latching elements 73a and 53, and 74a and 54. The function of the latching means is to prevent, when engaged, transverse separation of the gripper elements 37' and 37" vertically away from each other beyond allowable tolerances, and specifically to oppose the influence of the centrifugal forces developed in the rotation of the revolving frame. As the gripper elements 37' and 37" engage the top and bottom surfaces of the cable 2 at the start of the active stretch, the upper shoe 59 is pushed upwards and away from the lower shoe 77, as permitted by the displacement of upper crosspin 57 in its vertical slots, by an amount corresponding to the diameter of the cable being pulled. The compressible member 67 is thereby compressed a proportional amount, developing against shoe 59 a force that varies substantially proportionally to the cable diameter squared due to the flattening of the top and bottom areas of the spherical member, as will readily be understood. The traction force exerted on the cable varies correspondingly as a function of the cable diameter. Thus it is seen that owing to the provision of the latching means 73a–53 and 74a–54, the pressure exerted by the friction shoes against the cable can be initially preset to a desired value depending on the weight and diameter of the cable, and that the latching means will then positively lock the friction shoes so as to maintain said pressure strictly constant throughout the extent of the common active stretch of the endless tracks, regardless of centrifugal force or other disturbing factors. The apparatus does not require any provision for adjustment in operation, thereby fulfilling one of the main objectives of the invention.

In the modification illustrated in FIGURE 5, the difference lies in the fact that there are provided in each gripper member two resilient pressure members 67a and 67b positioned side by side and each of which may be similar to the tennis ball-like element 67 previously described. In this case the U-shaped part 95 constituting the upper gripper element is of relatively wider size to accommodate both members 67a and 67b. Each of these members has its top engaged by a respective one of two flanges 64a and 64b (corresponding to single flange 64 of the first embodiment) and supported at the lower end of a related one of two screw studs 62a, 62b secured by lock nuts 63a, 63b to the upper crosspiece of the U-shaped member. The guide roller is in this case supported on a pin upstanding from the center of said crosspiece. Otherwise the arrangement is the same as in the first embodiment and similar parts have been given the same reference numbers as in FIGURE 4. This modification makes it possible to double the pulling force exerted on the cable as compared to the first embodiment. It will be understood that more than two pressure members such as 67a and 67b may be associated with each cable gripper member. All such pressure members are not necessarily associated with the upper presser shoes such as 59 (FIGURE 4), but one or more may if desired be interposed between the lower presser shoe such as 77, and the related supporting strip 70 of the lower gripper element 37". It will be understood that in predetermining the characteristics of cable pulling apparatus according to the invention, there are two chief factors which should be selected in accordance with the desired total draft force to be developed: these are the total number of gripper members 37 that are at any one time effective in the common active stretch of the endless tracks, and the number of pressure members, such as 67a, 67b, provided in each gripper member.

Figure 7:
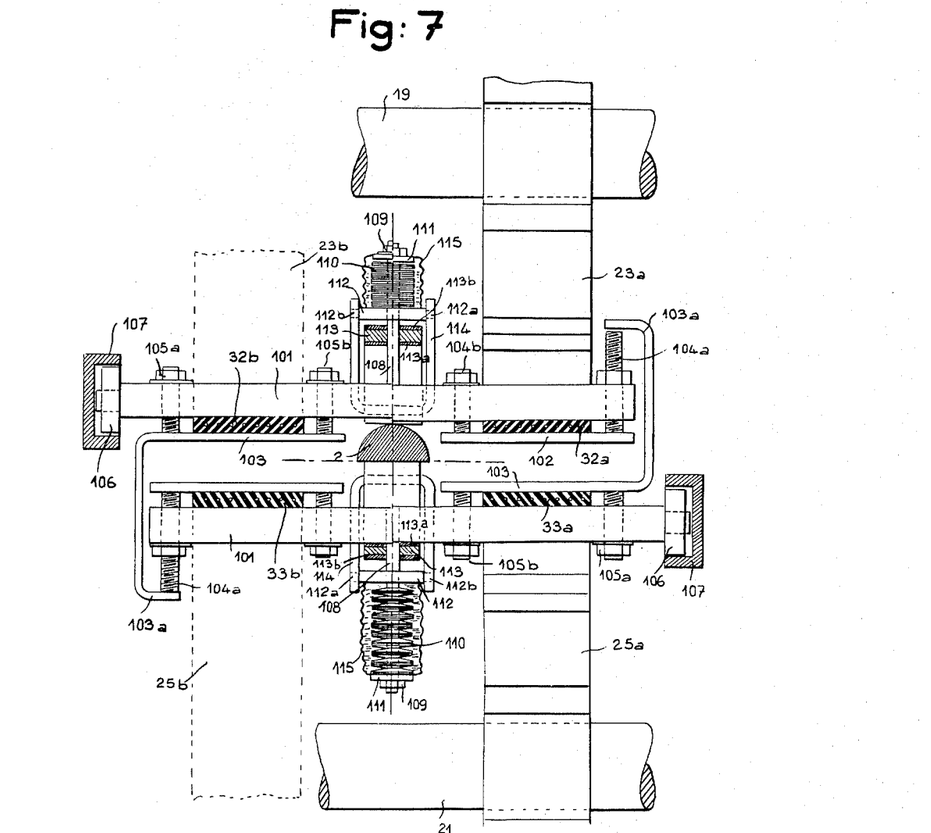
FIGURE 7 is a sectional view on line VII—VII of FIGURE 6.

In the further partially modified embodiment of the invention shown in FIGURES 6 and 7, the general arrangement may be the same as in the first embodiment and corresponding parts have been similarly referenced. It will be noted that each of the upper and lower cable gripping elements, herein designated 100, are similar, each consisting of a round crossbar 101 extending across the outer surfaces of the related tracks 32a–32b and 33a–33b respectively, and assembled thereto by means of backing plates 102, 103 and bolts 104a–104b, and 105a–105b respectively. Each bolt 104a has its shank extended to provide a latch element, and each backing plate 103 is bent vertically outwards and then horizontally inwards to provide a cooperating latching hook element 103a. The hook element 103a of each of the cable gripping elements cooperates with the end surface of bolt 104a of the other gripping element to provide the latching interengagement that was provided, in the first embodiment, by elements 73a–53 and 74a–54.

In this embodiment moreover the longitudinal guiding of the gripper elements is lateral rather than central. Specifically, each of the crossbars 101 has one of its ends extended to provide a trunnion about which a roller 106 is rotatable, riding in suitably disposed guide channels 107 supported in the revolving frame. It will be noted that the arrangement thus described is, generally, symmetrical with respect to the axis of cable 2 as between the upper and lower endless track assemblies.

Projecting vertically outwards from the outer midpoint of each crossbar 101 is a rod 108 having a stack of spring washers 110 surrounding its outer end part, between an outer washer 111 locked in position by a locknut 109 threaded on the outer end of rod 108, and a centrally apertured disc 112 freely slidable on rod 108. A friction shoe or segment 113 has its inner face engageable with the surface of cable 2, and is centrally provided with an inwardly opening slot 113c (also see FIGURE 6) defining two separate vertical legs for said shoe, which straddle the crossbar 101 so that the shoe is freely slidable and pivotable about the latter. The inner and outer surface of the legs of the shoe 113 are lined with metal sheet 113a and 113b. The shoe can be positioned by first unscrewing the pin 108 and then inserting a side notch 113c of the shoe around the rod by a lateral shifting movement of the shoe.

The disc 112 has two pivots 112a and 112b projecting from opposite sides of it and rotatably mounting the upper ends of a U-shaped member 114 having its side legs somewhat bent out of the plane of the U, as shown in FIGURE 6, and having its central crosspiece interposed between friction shoe 113 and an inbent flange formed at the lower end of the outer liner plate 113b of said shoe. Thus, so long as the friction shoe 113 is positioned outside the common active stretch of the endless tracks, it is urged by member 114 to a laterally displaced position at an angle to one side of rod 108, promoting a smooth and positive engagement of the inner surface of the shoe with the surface of the cable 2 as the shoe reaches the start of the active stretch. As shown, the stack of spring washers 110 are encased in a flexible sealed sheath 115 containing a body of lubricant grease.

As earlier noted, the entire arrangement described in this embodiment is symmetrical about the axis of symmetry defined by the axis of cable 2. It should be noted however for the intelligibility of FIGURE 7 that in the upper half of the drawing the movable parts are shown as they would be positioned in the case of a cable 2 of maximum diameter, while in the lower half the cable is assumed to have been removed and the parts are shown in their corresponding positions. Moreover, in the left half of the drawing the latch hook 103a is shown engaging the complementary latch surface provided by the tip of bolt 104a, while in the right half the latching elements are not yet fully engaged.

The over-all operation of the apparatus described with reference to FIGURES 6 and 7 is similar to that of the embodiment first described, and only the detailed action of the cable gripping means requires to be described anew. As two corresponding gripping elements 100 respectively pertaining to the upper and lower endless track structures are simultaneously brought to the starting point of the common active stretch of the tracks, the latch hooks 103a of the respective gripping elements automatically engage the end surfaces of the respective bolts 104a, thereby latching both gripping elements against separation from each other over the full extent of said common active stretch. At the end of the stretch, the latching means disengage, permitting separation of the gripping elements. In the latched condition of the gripping elements 100, the cable 2 acts against both identical friction shoes 113, pushing away from each other by substantially equal amounts each corresponding to the radius of the cable. The radial outward displacement imparted to each friction shoe 113 compresses the related stack of spring washers 110 as shown at the top of FIGURE 7. The characteristics of the stacks of spring washers 110 can be so selected that the force applied by each friction shoe 113 against the cable surface will be substantially proportional to the square of the cable diameter.

Figure 8:
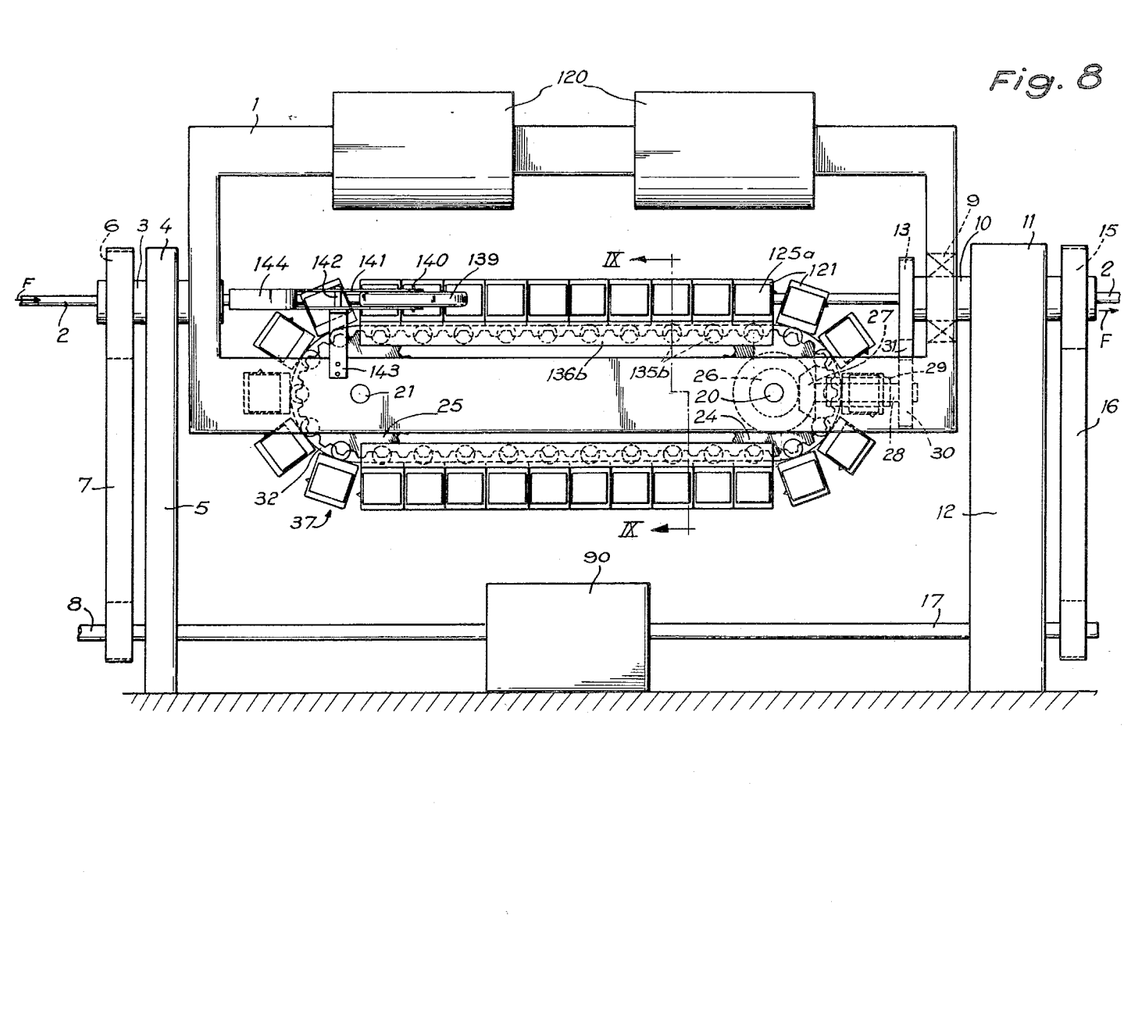
FIGURE 8 is a general longitudinal elevational view of another embodiment of revolving cable-hauling apparatus according to the invention, it being noted that the direction of cable feed is here shown as the reverse of that shown in FIGURE 1.
Figure 9:
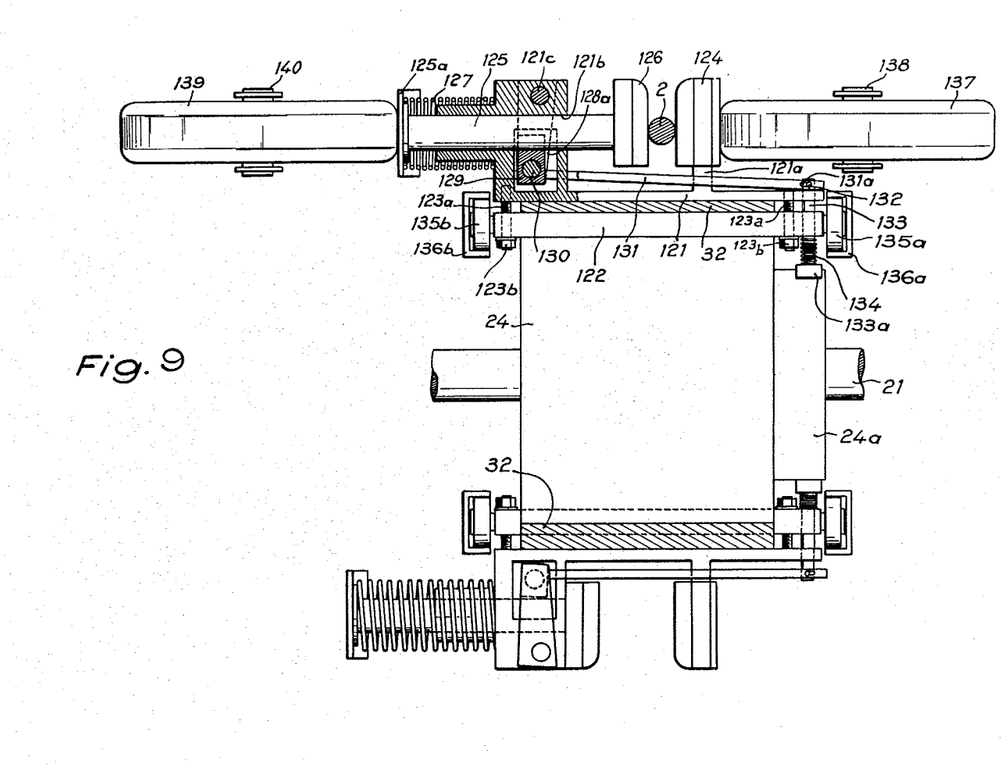
FIGURE 9 is a section on line IX—IX of FIGURE 8.
Figure 10:
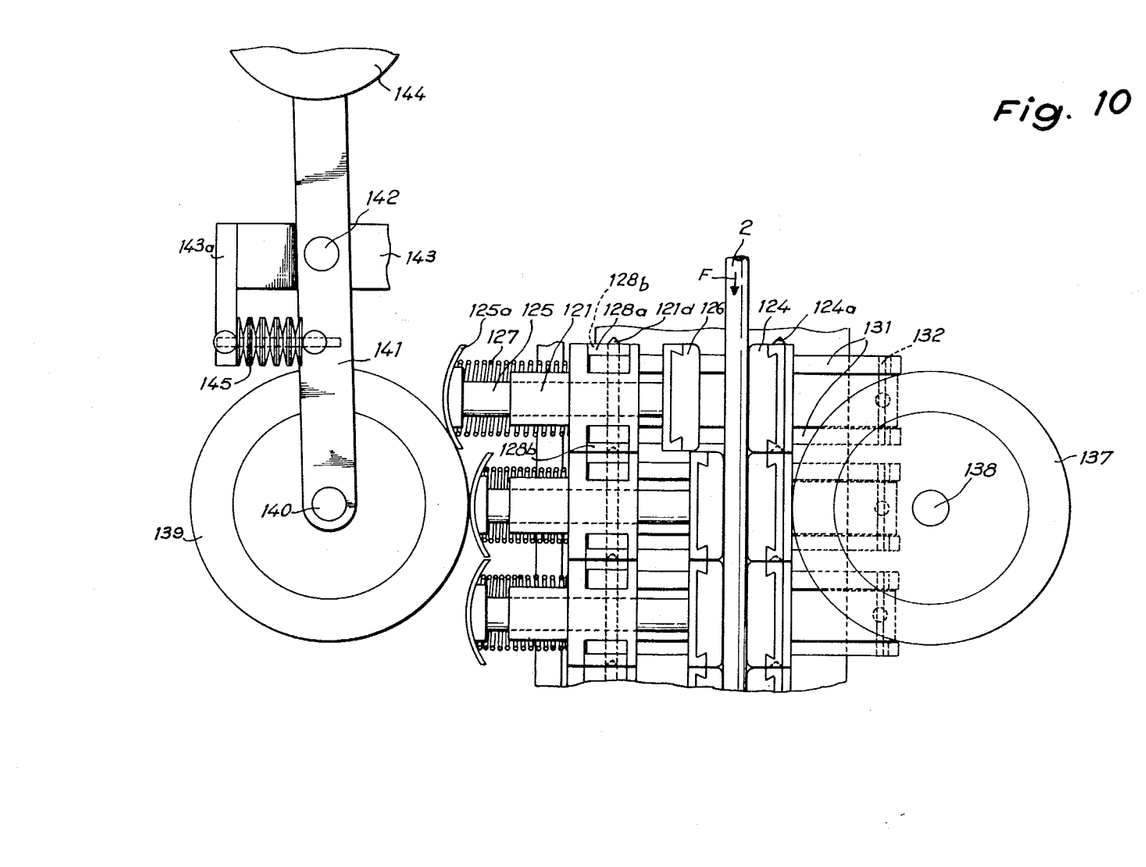
FIGURE 10 is an enlarged overhead plan view of the cable gripping mechanism.

In the further embodiment of the invention illustrated in FIGURES 8 to 10, in which parts corresponding to parts shown in FIGURES 1–4 have been similarly referenced, only a single endless track 32 is used and both cooperating cable gripping elements are carried by this single track. To ensure correct dynamic balancing of the revolving frame structure, counterweight means 120 are provided on the opposite side of the revolving frame 1 from that on which the endless track structure is provided.

The revolving frame 1 is driven in rotation about the axis of the cable 2 which extends through a first tubular end shaft 3 secured to frame 1 and journalled in a bearing 4 of fixed upright 5, and through a second tubular shaft 10 which is journalled relative to frame 1 by way of a bearing 9 and is journalled in a fixed upright 12 by way of a bearing 11. Shaft 3 carries a pulley 6 coupled by a drive belt 7 to another pulley keyed on a main drive shaft 8 driven from motor means not shown. Shaft 10 carries at its outer end a pulley 15 coupled by a drive belt 16 to another pulley keyed on a drive shaft 17 driven from main drive shaft 8 by way of speed variator 90. Keyed to the inner end of shaft 10 is a pulley 13 for driving an endless track as presently described.

Rotatably mounted on revolving frame 1 are a single pair of transverse shafts 20 and 21, having sprocket pulleys or sheaves 24 and 25 respectively fixed on them. Sheave 24 has a coaxial side shoulder 24a.

Shaft 20 further carries a bevel gear 26 meshing with a bevel gear 27 secured on a shaft 28 journalled through a bearing 29 in revolving frame 1 about an axis parallel to that of frame rotation. Shaft 28 is rotated by means of a pulley 30 keyed on it and coupled by a belt 31 to the pulley 13 on tubular shaft 10.

Trained around the pair of sheaves 24 and 25 is a single endless track 32 of substantial width, internally recessed to cooperate with the sprocket sheaves, provided with a continuous array of identical cable gripper members generally designated 37 in FIGURE 8. As will be evident especially from FIGURE 9, in this embodiment the cable gripping action is exerted in a chordal plane of the frame 1 instead of in a diametric plane as in all of the embodiments earlier described. In FIGURE 9, the gripping elements are shown in the position assumed by them over the active stretch of the endless track, for drawing the cable 2 in the (rightward) direction shown by arrow F in FIGURE 8, while in the lower part of FIGURE 9 the gripping elements are shown in the idle position.

Each gripping member comprises a generally flat base part 121 applied against the outer surface of band 32 and secured to the track by means of a backing plate 122 applied against the inner surface of the band in a depression recessed in said inner surface, and clamping bolts 123a and nuts 123b. The base 121 has a vertical flange 121a projecting outwardly from it in a longitudinal plane displaced somewhat to one side of the base 121 and track 32, and a friction segment or shoe 124 is fixedly supported in the flange 121a. Secured to the opposite side of the base 121 by way of the bolt 123b is a bearing member 121b formed with a bore extending in a transverse direction and having a shaft 125 slidable in it. The shaft 125 supports at its inner end a friction segment or shoe 126 cooperating with fixed shoe 124 to grip the cable 2 between both shoes as shown. At its outer end shaft 125 carries an end plate 125a serving as a seat for a compression spring 127 the opposite end of which bears against a shoulder of the bearing member 121b to urge shaft 125 and shoe 126 inwardly against shoe 124. The bearing member 121b is formed with a bore through which extends a pivot pin 121c positioned above shaft 125 and normally thereto, i.e. parallel to cable 2. Pivoted about pin 121c in opposite side recesses formed in bearing member 121b are two plates 128a and 128b (see FIGURE 10) which extend downwards to a point below shaft 125 on opposite sides of the shaft, and are bridged by a wedging member 129 extending through a recess formed in the lower part of bearing member 121b. Wedging member 129 is recessed in its intermediate part so as to conform with the lower half of the shaft 125 and engages the shaft surface with a small amount of clearance. A shaft 130 fixedly extending through the lower part of wedging member 129 has fixedly connected to its opposite projecting ends the two parallel spaced legs of a lever 131 which extends over and across the track 32. The free ends of lever legs 131 are interconnected by a crosspin 132 slidable a limited amount in slots 131a of said legs, and having pivoted to it the upper end of a push-rod 133 which extends slidably through aligned bores in the base 121 and backing plate 122 and formed with a head 133a at its lower end below the backing plate. A compression spring 134 abutted between head 133a and plate 122 biasses pushrod 133 downwards.

Rotatably supported from opposite sides of backing plate 122 beyond the opposite sides of band 32 are two bearings 135a and 135b riding in guide channels 136a and 136b supported longitudinally of frame 1.

A pair of camming wheels 137 and 139 are rotatably supported on frame 1 in a common plane, on opposite sides of track 32 adjacent the input end of the active stretch of the track. Wheel 137 is rotatable about a vertical shaft 138 carried by frame 1 and is adapted to engage the outer surfaces of the successive fixed segments 124 as they first enter said active stretch. Each fixed segment or shoe is provided with a tapered centering lug 124a on one side and a complementary centering recess in its opposite side, and the action of the camming wheel 137 on each segment 124 forces the centering lug 124a of the segment into the complementary recess of the next adjacent segment 124, so that all the adjacent fixed segments 124 become interlocked as they move into the active stretch of their path and so remain throughout the full extent of said stretch.

Camming wheel 139 is rotatable about a shaft 140 supported between the ends of a two-armed lever 141 pivoted at an intermediate point on a pivot 142 supported from a bracket 143 secured to revolving frame 1. The free end of lever 141 supports a counterweight 144. An arm 143a extending from bracket 143 serves to retain one end of a compression spring 145 the other end of which engages lever 141 between shaft 140 and pivot 142, so as to tend to rotate the lever 141 counterclockwise according to FIGURE 10. This action urges camming wheel 139 against the outer, convex, surfaces of the end plates 125a fixed to the outer ends of the respective shafts 125 carrying the movable segments 126, thereby urging the successive segments 126 into gripping engagement with the cable 2 against the cooperating fixed segments 124. Moreover, the successive base members 121 are provided with interlocking means similar to those associated with the fixed segments 124, and comprising the tapered centering lugs 121d and complementary recesses. The action of camming wheel 139 serves additionally to ensure the progressive interlocking of the lug 121d and recesses of all adjacent bases 121 as they reach the input end of the active stretch of their path.

In the operation of this embodiment, the rotation of revolving frame 1 and the concurrent displacement of the single endless track 32 around the frame are performed in a manner generally similar to what was described for the first embodiment and need not be described again.

As each successive gripping assembly along the endless track 32 reaches the input end of the active straightline stretch of the track, i.e. the left end of the upper stretch as shown in FIGURE 8, the camming wheel 137 acts to interlock all the successive fixed friction segments 126 by means of the centering lugs 124a as described. Simultaneously camming wheel 139 acting on end plates 125a urges the movable segments 126 into cable gripping engagement against the opposite segments 124 while simultaneously positively ensuring the interlocking of all the successive base members 121 by way of centering lugs 121d.

The amount of transverse axial displacement imparted to each shaft 125 by the wheel 139 depends on the diameter of cable 2 to be hauled, and the gripping pressure exerted on the cable by the segment 126 is primarily determined by the force of spring 145. As each end plate 125a successively disengages the camming wheel 139, shaft 125 tends to move back in the outward direction by the force of its spring 127. Such backward movement of shaft 125 and segment 126 is prevented, however, by a jamming action of the wedging member 129 which tends to pivot together with the plates 128a and 128 and lever 131 about the upper pivot 121c, thereby preventing backing movement of shaft 125 and blocking the movable friction shoe or segment 126 in the position to which it was moved by the camming wheel 139. The cable 2 is thereby positively gripped under prescribed pressure between the segments 124 and 126 through the active stretch of the endless track.

At the output end of the stretch, the annular shoulder 24a of sheave 24 cams the head 133a of pushrod 133 in an upward direction against spring 134. The pushrod 133 displaces the free ends of lever 131 upwardly, rocking the wedging member 129 in a direction to release the shaft 125 for movement in the outward direction under the force of spring 127. The shaft 125 and movable segment 126 are thereby brought to the idle position shown at the bottom of FIGURE 9.

It will be seen that in the last described form of the invention as in the other embodiments, the apparatus ensures haulage of the cable with a grip that can be readily determined in advance by suitable choice of the characteristics of the spring 145 as a function of cable diameter, and that the force of the grip is maintained positively at the selected value owing to the latching means, herein including the wedging member 129, and associated parts 131 to 134, coupled with centering lugs 121d and 124d. Advantageously spring 145 is provided in the form of a stack of spring washers, as shown. The simplified embodiment described with reference to FIGURES 8–10 is especially useful in cases where relatively low haulage forces are required. In addition to its simplicity it has the advantage that the cable gripping and pulling force is determined by the selection of a single spring, 145, rather than having one or more separate presser members for each of the individual cable gripping means. In this embodiment of the invention the gripping force can readily be adjusted in operation, should this be desired.

Thus it will be seen that in all of the embodiments described, the invention provides efficient and practical apparatus for simultaneously hauling and rotating a cable, rope, or similar elongated element along and around its longitudinal axis, while developing a gripping force on the cable that will be maintained accurately constant at a preselected value proportional to, or some other desired increasing function of, the diameter of the cable to be hauled, over a wide range of cable diameters, without requiring external adjustment unless this should be desired. It will be apparent that various changes and modifications may be introduced into the exemplary embodiments illustrated and described without exceeding the scope of the invention. While the invention is of especial advantage when applied to revolving haulage means, it may also find use in connection with, and is clearly applicable to, non-revolving apparatus.

What is claimed is:

1. Apparatus for hauling rope-like articles comprising a frame, endless track means mounted on said frame for continuous displacement therearound and including a straight stretch of track, a series of gripping members supported on the endless track means and each comprising a pair of cooperating gripper elements transversely relatively displaceable and having gripping surfaces directed towards each other, means resiliently pressing said elements relatively together into gripping engagement with a rope-like article guided towards and parallel to said straight stretch of track, and latching means on said gripping members operable as both elements of each member reach the start of said straight stretch to lock the elements against transverse relative displacement in the article-gripping position as determined by said resilient means through the extent of said stretch, and disengageable as said elements reach the far end of said stretch to release the article.

2. Apparatus for simultaneously hauling and rotating rope-like articles comprising a revolving frame, endless track means mounted on said frame for continuous displacement therearound as the frame revolves and including a straight stretch of track extending adjacent and parallel to the axis of frame rotation, a series of gripping members supported on the endless track means and each comprising a pair of cooperating gripper elements transversely relatively displaceable and having gripping surfaces directed towards each other, means resiliently pressing said elements towards each other into gripping engagement with a rope-like article guided along the axis of frame rotation, and latching means on said gripping members operable as both elements of each member reach the start of said stretch to lock the elements against relative displacement in the article-gripping position as determined by said resilient means through the extent of said stretch, and disengageable as said elements reach the far end of said straight stretch to release the article.

3. Apparatus accordidng to claim 2, including means projecting laterally from each gripper element and movably engageable with an elongated guide surface supported on said frame parallel to said straight stretch.

4. Apparatus as claimed in claim 2, wherein said latching means comprise cooperating latching surfaces respectively carried by the respective gripper elements of each gripping member, interengageable as both gripper elements of each gripping member reach the start of said straight stretch and disengageable as both said gripper elements reach the remote end of said straight stretch.

5. Apparatus as claimed in claim 3, wherein said latching means comprise a latching device associated with at least one, transversely-displaceable one, of said gripper elements of each gripping member for locking said gripper element with respect to said endless track means at the start of said straight stretch and releasing said gripper element at the remote end of said straight stretch.

6. Apparatus for simultaneously hauling and rotating rope-like articles comprising a revolving frame; two endless track means mounted on said frame so as to have respective straight stretches extending adjacent to and on opposite sides of the axis of frame rotation; power means for rotating said frame and synchronously rotating said endless track means relative to the frame in directions to move the respective straight stretches thereof in a common sense; a series of gripper elements supported from the respective track means and cooperating in pairs to provide successive gripping members as corresponding elements of the respective track means reach a start point of the said straight stretch; the gripper elements each of said gripping members being transversely displaceable towards and away from each other and including gripping surfaces directed towards each other; resilient means associated with at least one gripper element of each gripping member to press it toward the cooperating gripper element into gripping engagement with a rope-like article guided along the axis of frame rotation between said straight stretches of the respective track means; and cooperating latching means on said gripper elements interengageable as both gripper elements reach a start point of said stretch to lock the elements against displacement away from each other in the article-gripping position as determined by said resilient means through the extent of said stretches, and disengageable as said gripper elements reach the far end of said stretches to release the article.

7. Apparatus for simultaneously hauling and rotating rope-like articles comprising a revolving frame; an endless track member mounted on said frame so as to have a straight stretch extending adjacent and to one side of the axis of frame rotation; power means for revolving said frame and concurrently rotating said endless track member relative thereto; two transversely spaced series of cooperating gripper elements supported from said track member for transverse relative displacement with respect to each other and having gripping surfaces directed towards each other; resilient pressure means supported on the frame and engageable with each gripper element of at least one of said series as said gripper element reaches a start point of said straight stretch to press it towards the cooperating gripper element into gripping engagement with a rope-like article fed along the axis of frame rotation; and latching means associated with the gripper elements of at least said one series for preventing transverse relative displacement of the gripper elements away from each other and from the article-gripping position as determined by said resilient means through the extent of said stretch, said latching means being disengageable as said gripper elements reach the far end of said stretch to release the article.

8. Apparatus as claimed in claim 6, wherein said resilient means comprises at least one flexible-walled, normally-spherical, gas-inflated member.

9. Apparatus as claimed in claim 6, wherein said resilient means comprises at least one stack of spring washers.

10. Apparatus as claimed in claim 7, wherein the elements of said one series are transversely displaceable and the gripper elements of the other series are substantially fixed in the transverse direction, spring means urging each gripper element of said one series away from the cooperating gripper element of the other series, and said resilient pressure means engageable with an outer end of each gripper element of said one series as said gripper element reaches the start point of said straight stretch to overcome the urge of said spring means.

11. Apparatus as claimed in claim 1, including interengageable means provided on all adjacent gripper elements on at least one side of said gripping members adapted for mutual interengagement as said gripper elements reach the start of said straight stretch and disengagement as said elements reach the remote end of said stretch.

References Cited in the file of this patent

UNITED STATES PATENTS

| | | |
|---|---|---|
| 2,339,762 | Bruestle | Jan. 25, 1944 |
| 2,429,201 | Connor et al. | Oct. 21, 1947 |
| 2,438,448 | Morton et al. | Mar. 23, 1948 |
| 2,544,256 | Ciaccio | Mar. 6, 1951 |
| 2,974,361 | Gercke et al. | Mar. 14, 1961 |
| 2,981,454 | Dickinson et al. | Apr. 25, 1961 |